(No Model.)
J. C. GLASS.
BRAKE MECHANISM.
No. 262,401. Patented Aug. 8, 1882.
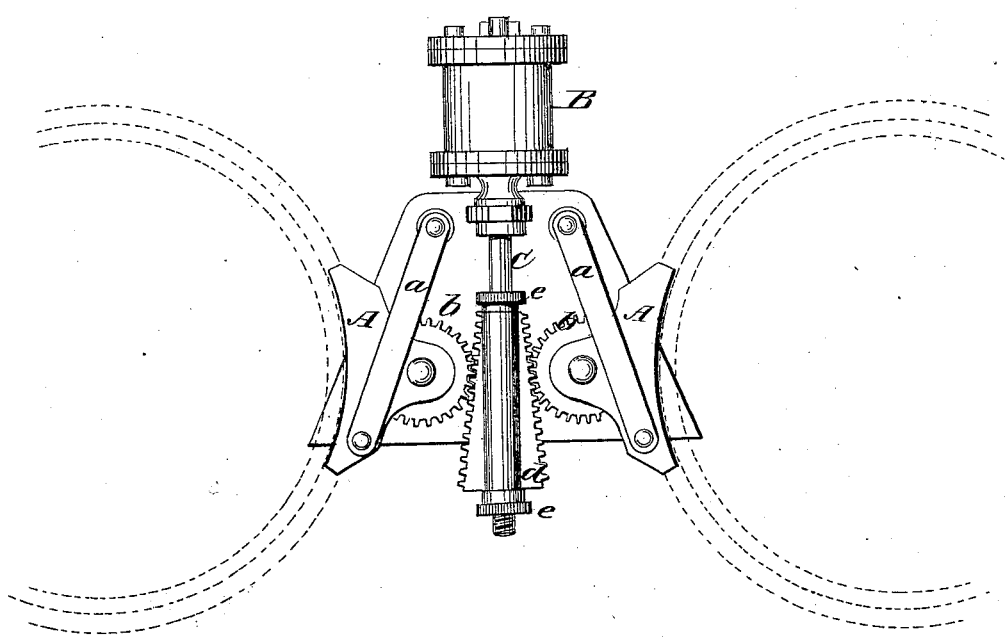
WITNESSES:
INVENTOR:
J. C. Glass
BY Munn & Co
ATTORNEYS.

UNITED STATES PATENT OFFICE.

JOHN C. GLASS, OF VERONA, PENNSYLVANIA.

BRAKE MECHANISM.

SPECIFICATION forming part of Letters Patent No. 262,401, dated August 8, 1882.

Application filed May 16, 1882. (No model.)

*To all whom it may concern:*

Be it known that I, JOHN C. GLASS, of Verona, in the county of Allegheny and State of Pennsylvania, have invented a new and Improved Brake Mechanism, of which the following is a full, clear, and exact description.

My invention consists in improved mechanism for applying brakes, applicable to brakes worked by air, steam, vacuum, or hand power, as hereinafter described and claimed.

Reference is to be had to the accompanying drawing, forming part of this specification, in which my improved mechanism is shown in elevation.

A A are the brake-shoes, suspended by links $a\ a$, and fitted at their rear side with wheels $b\ b$.

B is a steam or air cylinder, the piston-rod $c$ of which is provided at its lower end with a wedge-shaped block, $d$, that extends between the wheels $b\ b$ of the brake-shoes. The block $d$ is loose on the piston-rod, and held in place by nuts $e\ e$, so that it may be adjusted endwise to compensate for wear of the brake-shoes. The block $d$ and the wheels $b$ may be formed, as shown, with teeth for engagement; or they may be made with plane surfaces.

In operation, the piston-rod $c$ being raised, the wedge-block $d$ acts to force the brake-shoes outward with more or less pressure, according to the extent of movement. The rod carrying the wedge-block $d$ may be fitted for operation by hand as well as by steam or other power.

Having thus fully described my invention, what I claim as new, and desire to secure by Letters Patent, is—

1. The combination, in a brake, of the steam or air cylinder B, piston-rod C, toothed wedge $d$, and the toothed wheels $b$, pivoted in the brake-blocks, as shown and described.

2. The combination of the cylinder B, piston C, toothed wedge $d$, toothed wheels $b$, brake-blocks A, and supporting-links $a$, as shown and described.

3. In brake mechanism, the wedge-shaped block $d$, attached upon the rod C by the nuts $e\ e$, so that it may be adjusted, substantially as described.

JOHN CRESSON GLASS.

Witnesses:
R. B. PETERSON,
W. O'BRIEN.